US012199355B2

(12) United States Patent
Zhao et al.

(10) Patent No.: US 12,199,355 B2
(45) Date of Patent: Jan. 14, 2025

(54) ANTENNA FOR USE IN A RADIO COMMUNICATION TERMINAL

(71) Applicant: Sony Group Corporation, Tokyo (JP)

(72) Inventors: Kun Zhao, Malmö (SE); Zhinong Ying, Lund (SE)

(73) Assignee: Sony Group Corporation, Tokyo (JP)

( * ) Notice: Subject to any disclaimer, the term of this patent is extended or adjusted under 35 U.S.C. 154(b) by 88 days.

(21) Appl. No.: 17/642,192

(22) PCT Filed: Jun. 30, 2020

(86) PCT No.: PCT/EP2020/068428

§ 371 (c)(1),
(2) Date: Mar. 10, 2022

(87) PCT Pub. No.: WO2021/058153

PCT Pub. Date: Apr. 1, 2021

(65) Prior Publication Data

US 2022/0302591 A1 Sep. 22, 2022

(30) Foreign Application Priority Data

Sep. 27, 2019 (SE) .................................... 1951096-5

(51) Int. Cl.
*H01Q 5/40* (2015.01)
*H01Q 1/24* (2006.01)
*H01Q 1/48* (2006.01)

(52) U.S. Cl.
CPC ............... *H01Q 5/40* (2015.01); *H01Q 1/243* (2013.01); *H01Q 1/48* (2013.01)

(58) Field of Classification Search
CPC ............. H01Q 1/48; H01Q 1/243; H01Q 5/40
See application file for complete search history.

(56) References Cited

U.S. PATENT DOCUMENTS 2,711,440 A * 6/1955 Rines ........................ G01S 7/06 315/5
6,670,923 B1 * 12/2003 Kadambi ............... H01Q 21/30 343/893

(Continued)

FOREIGN PATENT DOCUMENTS

CN 102110873 A 6/2011
CN 104466393 A 3/2015

(Continued)

OTHER PUBLICATIONS

International Search Report and Written Opinion from corresponding International Application No. PCT/EP2020/068428, mailed on Sep. 18, 2020, 11 pages.

*Primary Examiner* — Ricardo I Magallanes
*Assistant Examiner* — Jordan E. DeWitt
(74) *Attorney, Agent, or Firm* — Tucker Ellis LLP

(57) ABSTRACT

Antenna (1), for use in a wireless terminal including a ground plane (11) and a metal frame (12) encompassing the ground plane with a gap (13) between the metal frame and the ground plane; wherein said antenna is configured to form a grounding connection (15) between the ground plane and the metal frame for operation in a first frequency range (FR1); and wherein the antenna comprises an open cavity structure (100) for a second frequency range (FR2).

19 Claims, 9 Drawing Sheets

(56) References Cited

U.S. PATENT DOCUMENTS

| | | | | |
|---|---|---|---|---|
| 7,551,142 | B1 * | 6/2009 | Zhang | H01Q 5/371 343/702 |
| 8,169,274 | B2 * | 5/2012 | Tahara | H01P 5/107 333/248 |
| 9,475,149 | B1 * | 10/2016 | Testrake | B29D 11/00317 |
| 9,548,535 | B1 * | 1/2017 | Kuo | H01Q 3/34 |
| 9,972,892 | B2 * | 5/2018 | Noori | H01Q 19/10 |
| 10,347,985 | B2 * | 7/2019 | Kim | H01Q 1/243 |
| 2004/0145521 | A1 * | 7/2004 | Hebron | H01Q 21/30 343/702 |
| 2004/0252061 | A1 * | 12/2004 | Vance | H01Q 5/371 343/702 |
| 2006/0244663 | A1 * | 11/2006 | Fleck | G06F 1/1698 343/702 |
| 2007/0059901 | A1 * | 3/2007 | Majumdar | H01G 11/48 438/455 |
| 2007/0085742 | A1 * | 4/2007 | Kikin | H01Q 9/0464 343/795 |
| 2007/0164907 | A1 * | 7/2007 | Gaucher | H01Q 1/38 343/700 MS |
| 2007/0247373 | A1 * | 10/2007 | Egorov | H01Q 5/378 343/702 |
| 2008/0316121 | A1 * | 12/2008 | Hobson | H01Q 1/243 343/702 |
| 2009/0021442 | A1 * | 1/2009 | Syed | H01Q 19/09 343/781 CA |
| 2009/0066579 | A1 * | 3/2009 | Lau | H01Q 1/243 343/700 MS |
| 2009/0322643 | A1 * | 12/2009 | Choudhury | H01Q 21/0025 343/851 |
| 2010/0053002 | A1 * | 3/2010 | Wojack | H01Q 9/0421 343/702 |
| 2010/0231481 | A1 * | 9/2010 | Chiang | H01Q 9/42 343/702 |
| 2011/0102284 | A1 * | 5/2011 | Brown | H01P 5/107 343/771 |
| 2011/0241949 | A1 * | 10/2011 | Nickel | H01Q 1/48 343/702 |
| 2013/0141303 | A1 | 6/2013 | Huynh | |
| 2013/0176178 | A1 * | 7/2013 | Chen | H01Q 9/42 343/702 |
| 2013/0229362 | A1 * | 9/2013 | Liu | G06F 3/041 345/173 |
| 2014/0043248 | A1 * | 2/2014 | Yeh | H01Q 7/00 345/173 |
| 2014/0113693 | A1 * | 4/2014 | Wei | H01Q 1/243 455/575.7 |
| 2015/0102974 | A1 * | 4/2015 | Stoytchev | H01Q 5/371 343/843 |
| 2015/0138021 | A1 * | 5/2015 | Konu | H01Q 1/243 343/702 |
| 2016/0226132 | A1 | 8/2016 | Kim et al. | |
| 2017/0214776 | A1 * | 7/2017 | Andujar Linares | H01Q 1/24 |
| 2017/0229762 | A1 * | 8/2017 | Zheng | H01Q 1/48 |
| 2018/0026341 | A1 * | 1/2018 | Mow | H01Q 1/243 343/702 |
| 2018/0048051 | A1 * | 2/2018 | Chang | H01Q 5/371 |
| 2018/0062256 | A1 * | 3/2018 | Kim | H01Q 13/085 |
| 2018/0069324 | A1 * | 3/2018 | Arfaei Malekzadeh | H01Q 9/0407 |
| 2018/0090817 | A1 * | 3/2018 | Rajagopalan | H01Q 1/2291 |
| 2018/0090847 | A1 * | 3/2018 | Romano | H01Q 9/0414 |
| 2018/0097277 | A1 * | 4/2018 | Koga | H01Q 1/523 |
| 2018/0212321 | A1 * | 7/2018 | Yang | H01Q 1/243 |
| 2018/0309199 | A1 * | 10/2018 | Yu | H01Q 9/36 |
| 2018/0375189 | A1 * | 12/2018 | Hawaka | H01Q 1/526 |
| 2019/0006738 | A1 * | 1/2019 | Yu | H01Q 15/14 |
| 2019/0104212 | A1 * | 4/2019 | Lee | H01Q 9/0435 |
| 2020/0067192 | A1 * | 2/2020 | Arfaei Malekzadeh | H01Q 9/0407 |
| 2020/0091622 | A1 * | 3/2020 | Turpin | H01Q 5/42 |
| 2020/0194870 | A1 * | 6/2020 | Yamamoto | G06F 1/1656 |
| 2020/0227821 | A1 * | 7/2020 | Wu | H01Q 1/38 |
| 2020/0280133 | A1 * | 9/2020 | Avser | H01Q 5/42 |
| 2021/0091472 | A1 * | 3/2021 | Avser | H01Q 9/0407 |
| 2021/0149484 | A1 * | 5/2021 | Korphi | G02B 7/08 |
| 2021/0328351 | A1 * | 10/2021 | Avser | H01Q 9/0485 |
| 2022/0029298 | A1 * | 1/2022 | Huang | H01Q 9/42 |
| 2022/0109245 | A1 * | 4/2022 | Yang | H01Q 3/245 |
| 2023/0035028 | A1 * | 2/2023 | Qin | H01Q 1/242 |
| 2023/0224388 | A1 * | 7/2023 | Bates | G06F 1/1656 455/566 |

FOREIGN PATENT DOCUMENTS

| | | | | | |
|---|---|---|---|---|---|
| CN | 106785353 | A | * | 5/2017 | H01Q 1/243 |
| CN | 107154535 | A | * | 9/2017 | H01Q 1/22 |
| CN | 107437661 | A | * | 12/2017 | H01Q 1/36 |
| CN | 107689485 | A | | 2/2018 | |
| CN | 109494447 | A | | 3/2019 | |
| CN | 109643854 | A | | 4/2019 | |
| CN | 110178267 | A | | 8/2019 | |
| CN | 112563747 | A | * | 3/2021 | H01Q 1/243 |
| EP | 4254660 | A1 | * | 10/2023 | H01Q 1/22 |
| JP | 2015213285 | A | | 11/2015 | |
| WO | WO-2017141600 | A1 | | 8/2017 | |
| WO | WO-2018075578 | A1 | * | 4/2018 | H01Q 1/243 |
| WO | WO-2018095535 | A1 | * | 5/2018 | H01Q 1/243 |
| WO | 2019120515 | A1 | | 6/2019 | |
| WO | WO-2021058153 | A1 | * | 4/2021 | H01Q 1/243 |

* cited by examiner

ANTENNA FOR USE IN A RADIO COMMUNICATION TERMINAL

TECHNICAL FIELD

This disclosure relates to the field of antennae for wireless terminals configured for wireless communication, and in particular to an antenna arrangement for use in at least two frequency ranges.

BACKGROUND

Electronic devices often include wireless communications circuitry, and such electronic devices may be referred to as wireless terminals. For example, cellular telephones, computers, and other devices often contain antennas and wireless transceivers for supporting wireless communications.

A large number of systems for wireless communication have been developed and used, for different purposes. Various specifications forming standard requirements for wireless communication have for example been administered through the 3rd Generation Partnership Project (3GPP) throughout the years. Progressing generations of specifications have been provided for setting up common rules for setting up and operating both a wireless radio interface between a wireless terminal and a base station, and various levels of operation of the wireless network. In 3GPP documentation, a wireless terminal, or wireless communication device, is commonly referred to as a User Equipment (UE). A base station defines a cell and is operative to serve a surrounding area with radio access for UEs, by providing radio access to UEs within a cell. A base station is also referred to herein as a node or access node, and various terms are used in 3GPP for different types of systems or specification. An access network, or Radio Access Network (RAN), typically includes a plurality of access nodes, and is connected to a Core Network (CN) which inter alia provides access to other communication networks. In the so-called 3G specifications, the term NodeB is used to denote an access node, whereas in the so-called 4G specifications, also referred to as Long-Term Evolution (LTE), the term eNodeB (eNB) is used. A further developed set of specifications for radio communication are referred to as the 5G type radio communication system (5GS), including the New Radio (NR) technology, wherein the term gNB is used to denote an access node.

Progressive development of wireless communication technology and requirements includes operation in higher frequency bands. It may for example be desirable to support wireless communications in millimeter wave communications bands. Millimeter wave communications, which are sometimes referred to as extremely high frequency communications, involve communications at frequencies of about 10-400 GHz. Operation at these frequencies may support high bandwidths and controlled directional communication, such as beam-steering, but may also raise significant challenges. For example, millimeter wave communications are often line-of-sight communications and can be characterized by substantial attenuation during signal propagation. In 3GPP, mm wave communication is defined under the aforementioned 5G NR. This may include communication capability at different frequencies, including millimeter wave spectrum above 24 GHz.

For implementation in electronic devices configured to act as wireless terminals, new antenna solutions may be required to accommodate operation in the higher frequency range of mm wavelength bands. At the same time, operation shall preferably still be supported at lower frequency bands, to support legacy communication.

SUMMARY

In view of the general objective of providing an antenna solution for use in a wireless terminal to provide communication capability in different frequency ranges, an antenna, an antenna arrangement and a wireless terminal as outlined in the independent claims is provided. These antenna solutions include inter alia An antenna, for use in a wireless terminal including a ground plane and a metal frame encompassing the ground plane with a gap between the metal frame and the ground plane;

- wherein said antenna is configured to form a grounding connection between the ground plane and the metal frame for a first frequency range; and
- wherein the antenna comprises an open cavity structure for a second frequency range.

Various embodiments are outlined in the dependent claims.

BRIEF DESCRIPTION OF THE DRAWINGS

Various embodiments will be described with reference to the drawings, in which.

DETAILED DESCRIPTION

The invention will be described more fully hereinafter with reference to the accompanying drawings, in which embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art.

It will be understood that, when an element is referred to as being "connected" to another element, it can be directly connected to the other element or intervening elements may be present. In contrast, when an element is referred to as being "directly connected" to another element, there are no intervening elements present. Like numbers refer to like elements throughout. It will furthermore be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present invention. As used herein, the term "and/or" includes any and all combinations of one or more of the associated listed items.

Well-known functions or constructions may not be described in detail for brevity and/or clarity. Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of this specification and the relevant art and will not be interpreted in an idealized or overly formal sense expressly so defined herein.

Embodiments of the invention are described herein with reference to schematic illustrations of idealized embodiments of the invention. As such, variations from the shapes and relative sizes of the illustrations as a result, for example, of manufacturing techniques and/or tolerances, are to be expected. Thus, embodiments of the invention should not be construed as limited to the particular shapes and relative sizes of regions illustrated herein but are to include deviations in shapes and/or relative sizes that result, for example, from different operational constraints and/or from manufacturing constraints. Thus, the elements illustrated in the figures are schematic in nature and their shapes are not intended to illustrate the actual shape of a region of a device and are not intended to limit the scope of the invention.

Figure 1:
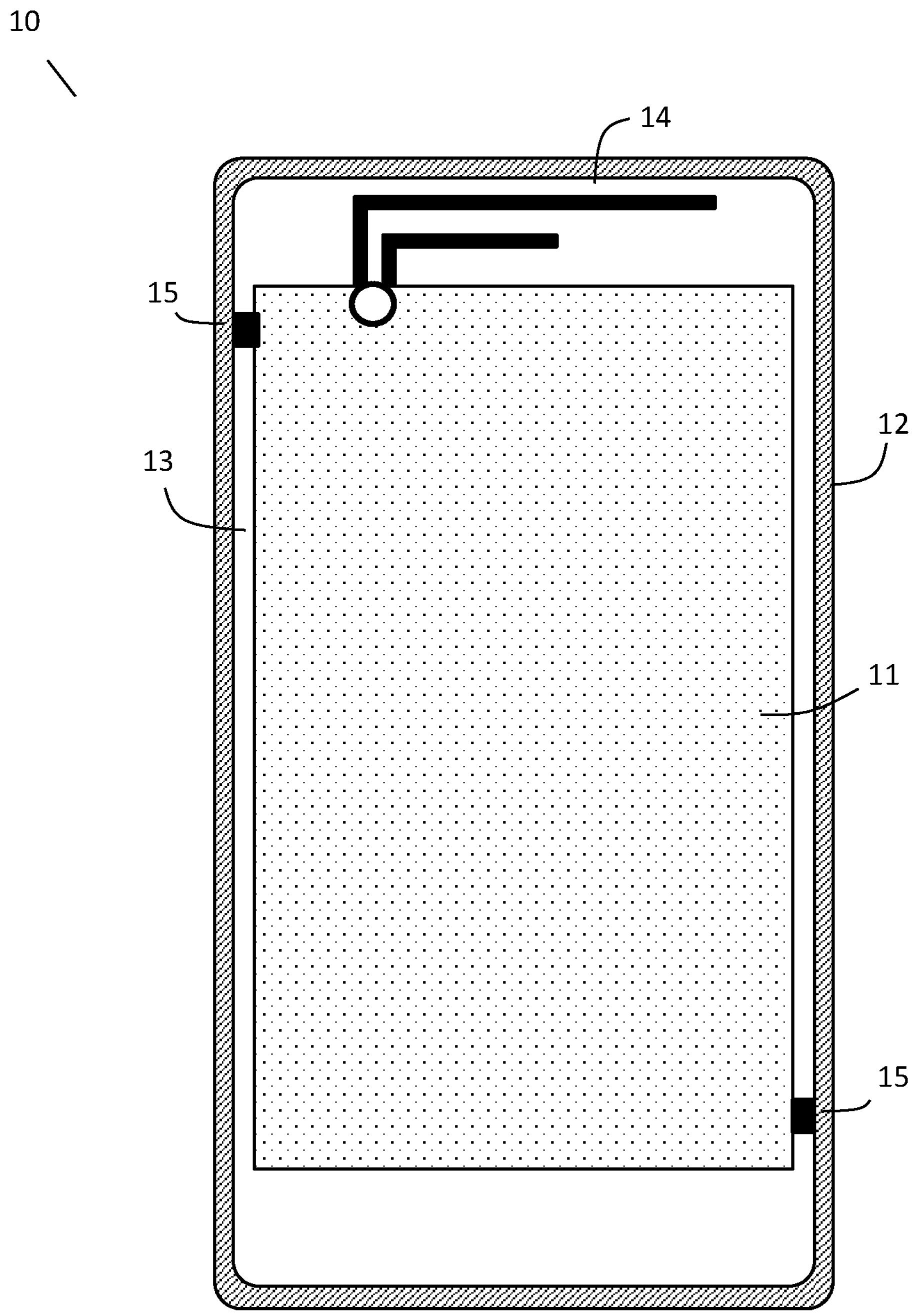
FIG. 1 schematically illustrates an embodiment of antenna arrangement including a ground plane and a metal frame encompassing the ground plane with a gap between the metal frame and the ground plane, including an antenna for a first frequency range and an antenna for a second frequency range.

Various solutions are presented herein related to improvements in the art of edge mounted antennae, supporting at least two frequency ranges (FR). Common for such embodiments is that a first frequency range FR1 has an associated upper frequency limit, whereas a second, higher, frequency range FR2 has an associated a lower frequency limit which is higher than the upper limit of FR1. Embodiments are primarily presented for a metal frame antenna arrangement for 3GPP frequency ranges FR1 and FR2, where FR1 e.g. has an associated upper frequency of 7.125 GHz, and FR2 (mm wave) e.g. has an associated lower frequency limit of 24 GHz, for a 5G wireless terminal. However, alternative frequency ranges are plausible within the concept of the described embodiments FIG. 1 schematically illustrates an antenna arrangement 10 according to a general embodiment. It is as such a common solution to integrate an antenna 14 for cellular communication under a lower frequency range FR1 on a metal frame 12 of a wireless terminal. For this kind of antenna design, it may be necessary to ground/short the metal frame 12 with a ground plane 11 of a main substrate 110, such as a PCB, of the terminal in at least one, and normally several, position(s). In the drawing, two grounding connections 15 are illustrated. The objective with the grounding connections may be tuning of cellular antenna 14 to correct frequency with multiband, and to kill parasitic effects from other part of the metal frame 12. In accordance with the solutions outlined herein, at least one of those grounding connections are used as an antenna in a higher frequency range FR2.

Figure 2A:
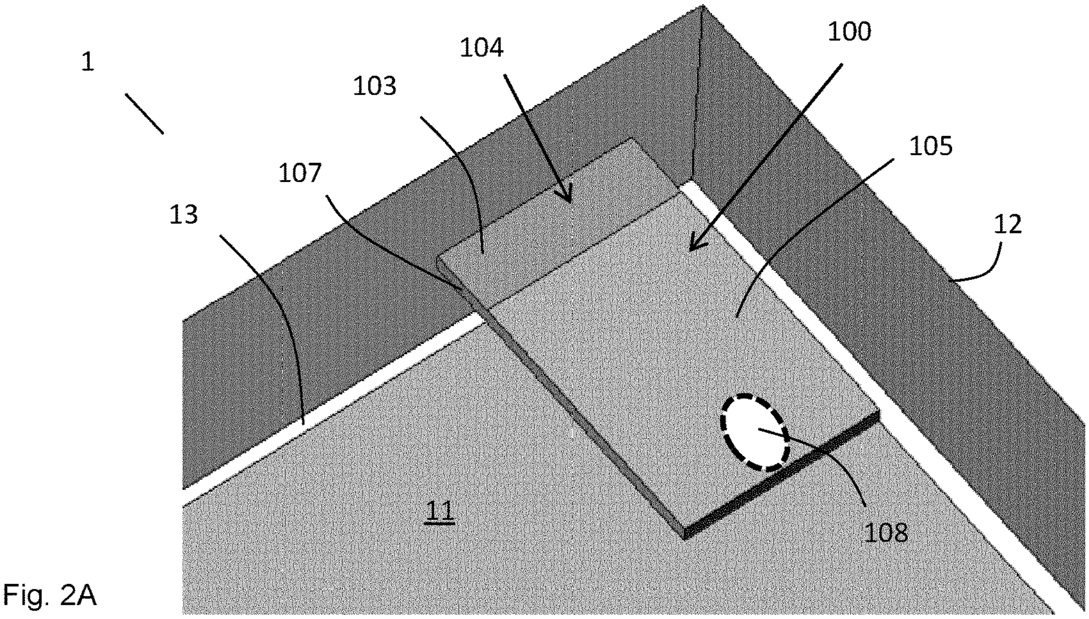
FIG. 2A schematically illustrates a perspective view of an antenna comprising an open cavity structure for a second frequency range, according to an embodiment.
Figure 2B:
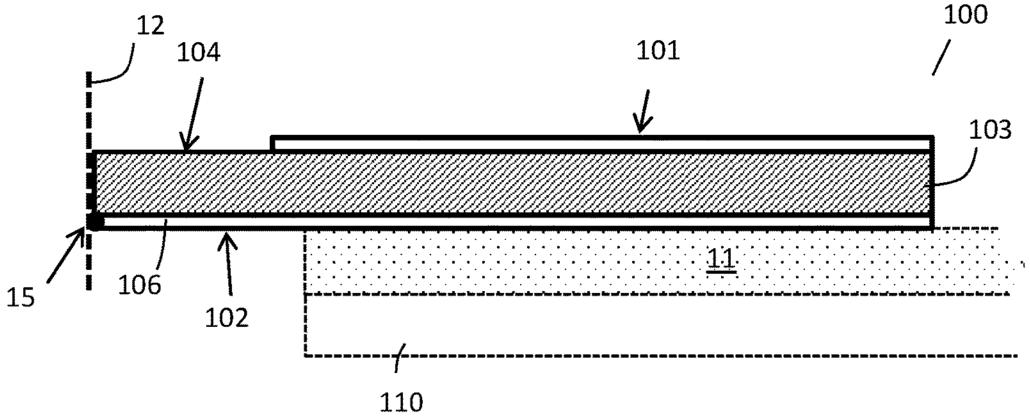
FIG. 2B shows a cross-sectional view of the open cavity structure, according to an embodiment.

FIGS. 2A and 2B illustrates more closely how an embodiment of such an antenna 1 is configured. The antenna 1 is devised for use in a wireless terminal which includes a ground plane 11 and a metal frame 12 encompassing the ground plane. Specifically, the metal frame 12 is arranged with a clearance or gap 13 to the ground plane 11 provided on a substrate 110. The antenna 1 is configured to form a grounding connection 15 between the ground plane 11 and the metal frame 12 for operation at a first frequency range FR1. Moreover, the antenna 1 comprises an open cavity structure 100 for a second frequency range FR2. That is, the open cavity structure 100 is suitable for or configured for emission of Radio Frequency (RF) energy within the second frequency range FR2. FIG. 2A also indicates a feeding point 108 of the antenna 1 for FR2 operation.

In various embodiments, the open cavity structure 100 is a waveguide structure which is at least partially open-ended in said gap 13. In other words, the grounding connection 15 is designed as an open cavity structure, or open-end waveguide structure where a first surface 101, e.g. a top surface, is partially open-ended. Thereby, and open surface portion 104 is arranged at the gap 13, between the metal frame 12 and ground plane 11. At least one other surface or portion of the open cavity structure 100 is directly connected with the metal frame 12 to ensure the antenna 1 behaves as grounding connection at FR1. Said at least one other surface may include an edge or side surface 107 which connects to the first surface 101, and/or a second surface 102, opposite the first surface 101, of the open cavity structure 100.

In some embodiments, said open cavity structure 100 comprises a dielectric member 103, and a conductive member configured to connect the ground plane with the metal frame. That is, in these embodiments the conductive member forms the grounding connection 15 between the ground plane and the metal frame for operation in the first frequency range FR1. The dielectric member 103 may e.g. include a ceramic, plastic or other dielectric material. The conductive member may include a surface coating on said dielectric member, such as a metal cover 102, 105, 107 or metallized surfaces 102, 105, 107 of the dielectric member 103. In an alternative embodiment, the dielectric member may be air, such as a void, shaped and confined within metal surface portions 102, 105, 107.

The conductive member, providing the grounding connection 15, may be arranged to partially cover the dielectric member 103 so as to present the open surface portion 104 of the dielectric member at said gap 13, in the first surface 101 of the open cavity structure 100.

It may be noted that FIG. 2B illustrates that the conductive member comprises a portion 106 at the second, lower, surface 102 of the open cavity structure 100, connecting to the metal ring 12 to form a grounding position 15 for FR1 operation. However, in alternative embodiments, also the second surface 102 is partially or completely open, wherein the conductive member is provided as the conductive edge surface 107.

Figure 3A:
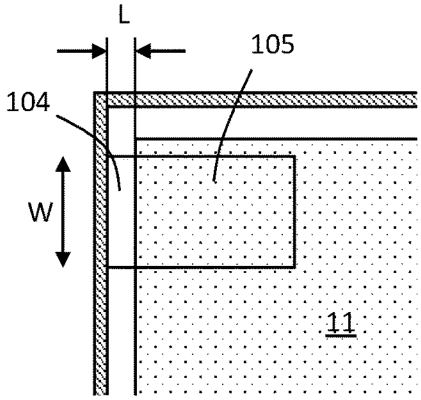
FIG. 3A shows an elevation view of the open cavity structure from a first side, according to an embodiment.

FIG. 3A schematically illustrates the Antenna 1 as seen towards the first surface 101, i.e. the upper surface in FIGS. 2A and 2B. The dotted surfaces are conductive, including the ground plane 11 and the surface portion 105 of the conductive member. However, the open surface portion 104 is arranged at the gap 13, at least partially between an inner perimeter of the metal ring 12 and an outer edge of the ground plane 11. Notably, the ground plane 11 may be formed by means of an outer and/or inner layer on a substrate 110, to which various further components may be mounted (not shown).

Figure 3B:
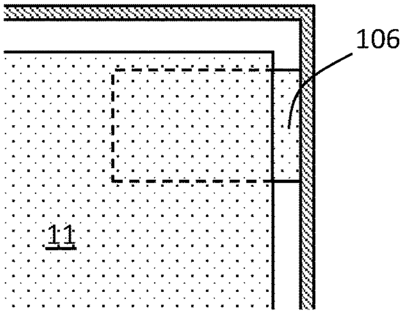
FIG. 3B shows an elevation view of the open cavity structure from an opposite, second, side, according to an embodiment.

FIG. 3B, on the other hand shows a view towards the opposite, second, surface 102 of the open cavity structure 100. Here, and embodiment in accordance with FIG. 2B is shown, wherein the conductive member includes a second surface member 106, covering the second surface 102 in the gap 13.

The dimensions of the open surface portion 104 impact the frequency and bandwidth of the frequency range FR2 at which the antenna 1 is configured to operate. The grounding element 15, formed by the conductive member configured to connect to the metal frame 12 over the gap 13, has a width W in a plane parallel with the ground plane 11, as indicated in FIG. 3A. In some embodiments, the width W is half the wavelength, $\lambda/2$, of a central frequency of the intended FR2, where the wavelength $\lambda$ is the effective wavelength which takes the permittivity of the material surrounded into account. In other words, the width is roughly $\lambda/2$ half wavelength of the center frequency. For an example of FR2 operation at 28 GHz, W may be about 5 mm, or dependent on influence from other components, in the range of 4-6 mm. With regard to the depth L of the open portion 104, the larger it is, the larger bandwidth the proposed antenna may be configured to achieve. In one embodiment, where the depth L is 2 mm, the achievable bandwidth at FR2 is about 4 GHz. In various embodiments, the antenna 1 may be configured with a depth in the range of 1.5 to 2.5 mm.

Figure 4:
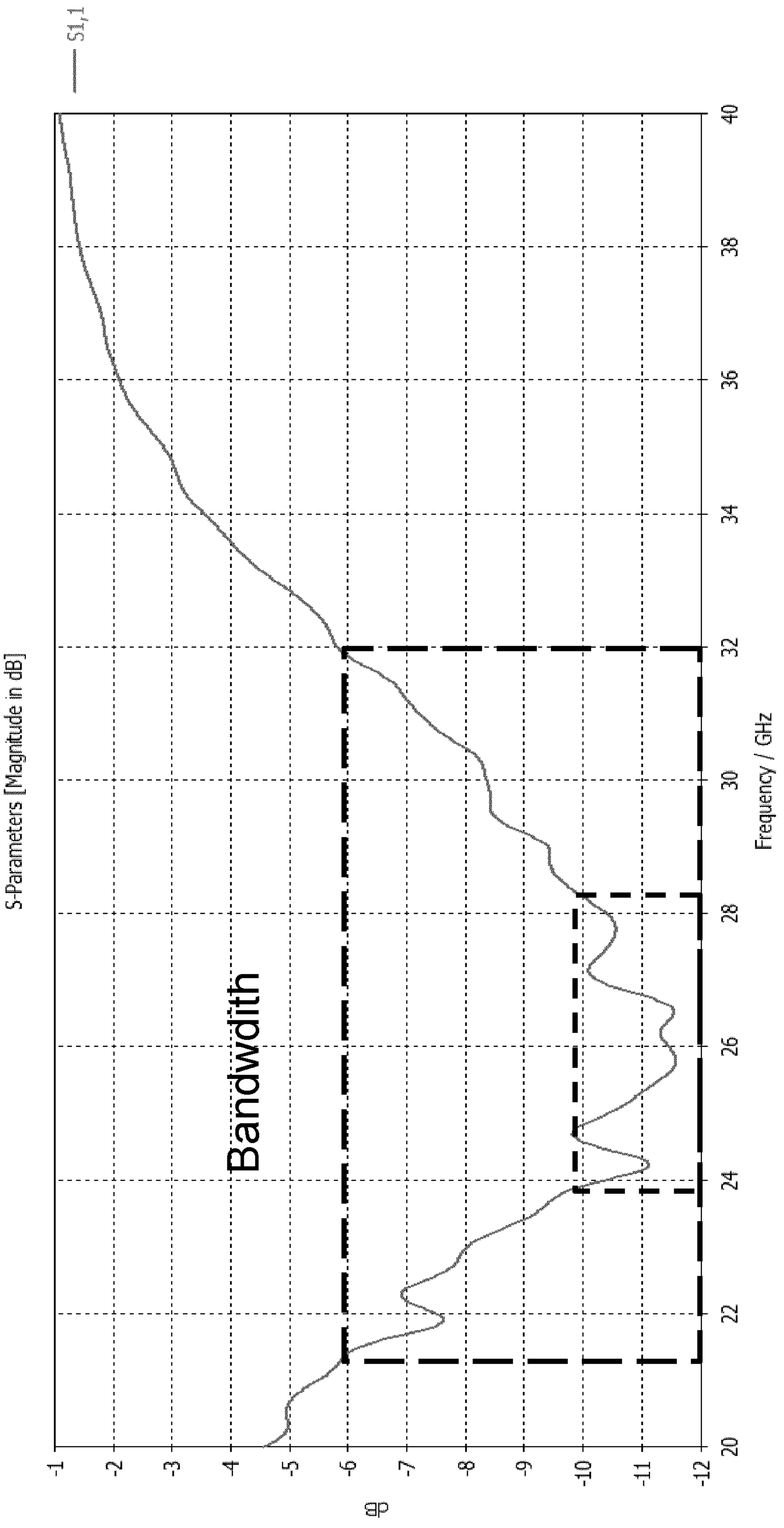
FIG. 4 schematically illustrates the bandwidth obtained by means of an embodiment of the proposed antenna, in the second wavelength range.

FIG. 4 schematically illustrates a graph of simulated bandwidth measurements, using an embodiment in accordance with the embodiment as discussed with reference to FIGS. 2-3. The proposed open cavity structure 100 of the antenna 1 can achieve a very large bandwidth, such as 10 GHz with −6 dB impedance matching and 4 GHz with −10 dB impedance matching. The antenna gain in this embodiment is around 10 dBi.

Figure 5:
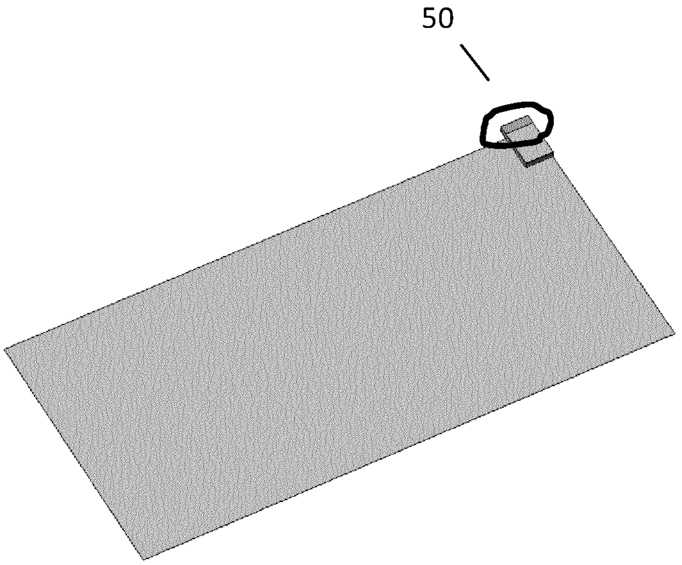
FIG. 5 schematically illustrates an antenna aperture of the antenna absent the metal frame.
Figure 6:
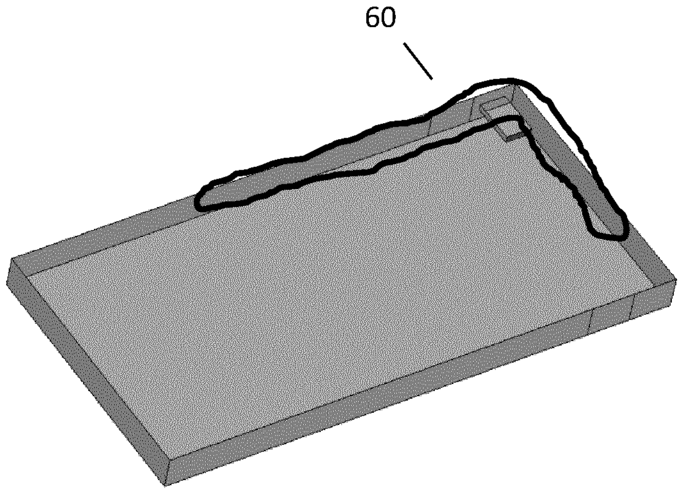
FIG. 6 schematically illustrates the enlarged antenna aperture as accomplished by connection of the open cavity structure to the metal frame.

FIG. 5 schematically illustrates the antenna aperture 50, for the open cavity structure 100 as described, without connection to a metal frame. FIG. 6, on the other hand, schematically illustrates the antenna aperture 60, for the open cavity structure 100 as described, when connected to the metal frame 12 at the grounding position 15. The effect is that the antenna aperture is enlarged by introduction of the metal frame 12.

Figure 7:
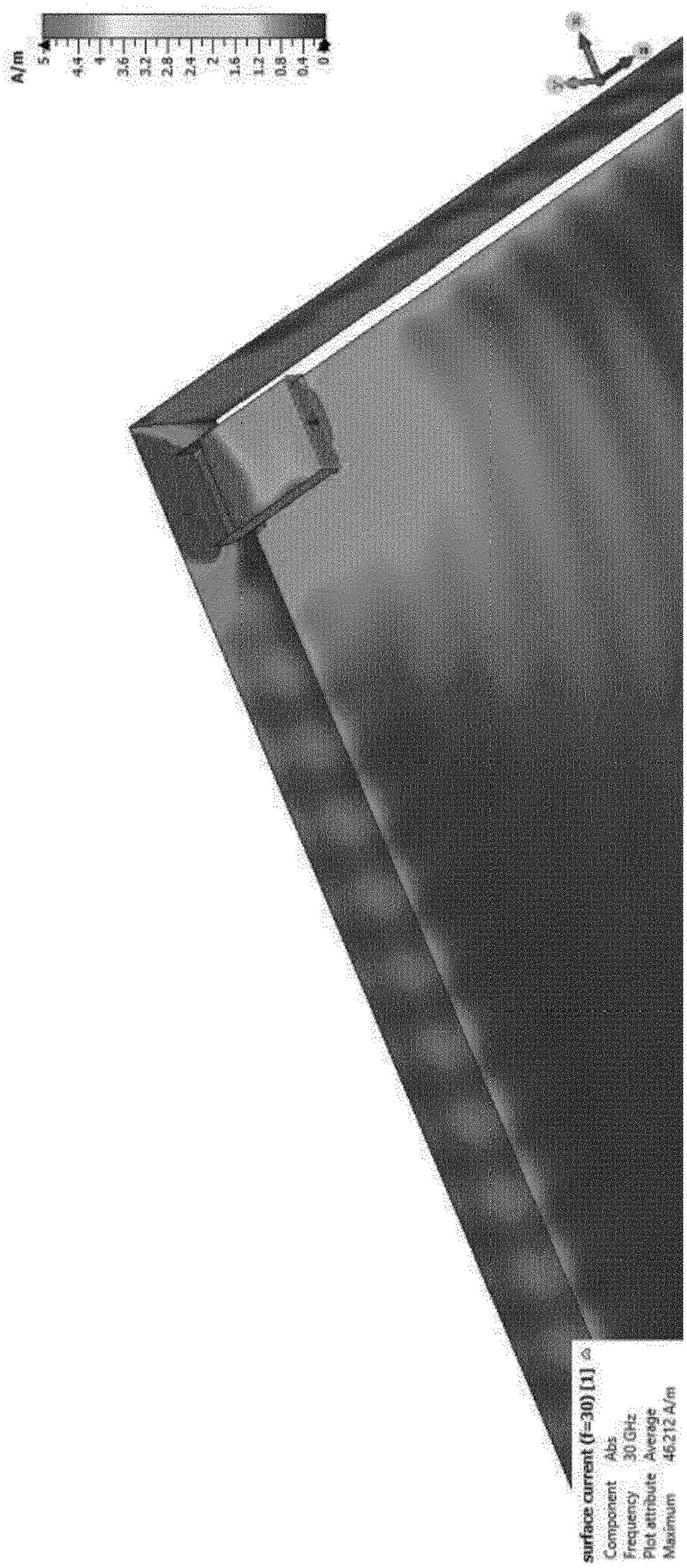
FIG. 7 schematically illustrates a surface current obtained by an embodiment of the antenna in the second wavelength range in simulations.

The proposed antenna arrangement thus achieves a high gain since the proposed structure feeds the energy on the metal frame, which enlarges the antenna aperture as a larger radiator. FIG. 7 schematically illustrates a simulation of the surface current at 28 GHz over the antenna arrangement 10, including the antenna 1, the ground plane 11 and the metal frame 12. The achieved peak gain is sufficient to meet 3GPP spherical coverage requirement for mobile handsets with about 12.5 dBm input power.

Figure 8:
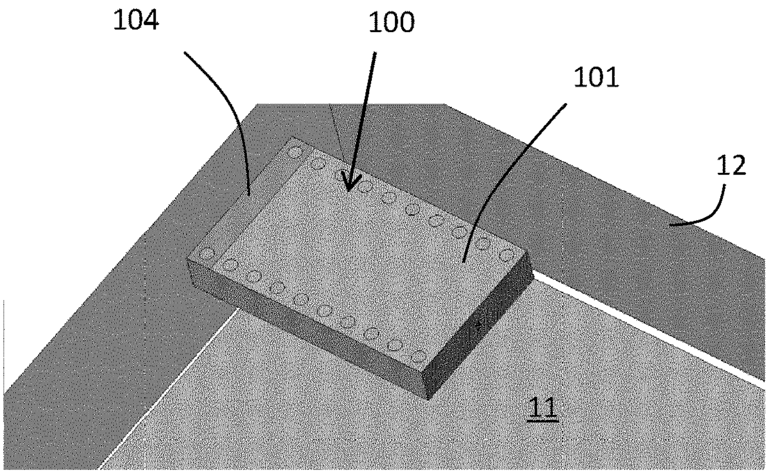
FIG. 8 schematically illustrates an embodiment of the antenna, in which the open cavity structure is formed as a substrate integrated open cavity.

FIG. 8 schematically illustrates an embodiment of the antenna 1, in which the open cavity structure 100 is a substrate integrated open cavity (SIW). SIW is an alternative to a metallization of one or more surfaces the dielectric member 103 and provides the benefit of easy fabrication.

As shown in the embodiments of FIGS. 2, 3 and 8, the open cavity structure 100 may be attached to the ground plane 11, i.e. to a substrate 110 incorporating the ground plane 11. The open cavity structure 100 may be bonded to the ground plane 11 or the substrate 110 by means of soldering, gluing or other means. Moreover, the open cavity structure protrudes sideways from the ground plane 11, i.e. projects out over a side edge of the substrate 110, such that the open portion 103 is positioned in the gap 13 when the open cavity structure is connected to the metal frame 12. In a variant of this embodiment (not shown), the dielectric member 103 is integral with the substrate 110 of the ground plane 11, forming a projection out from a side edge of the substrate 110.

Figure 9A:
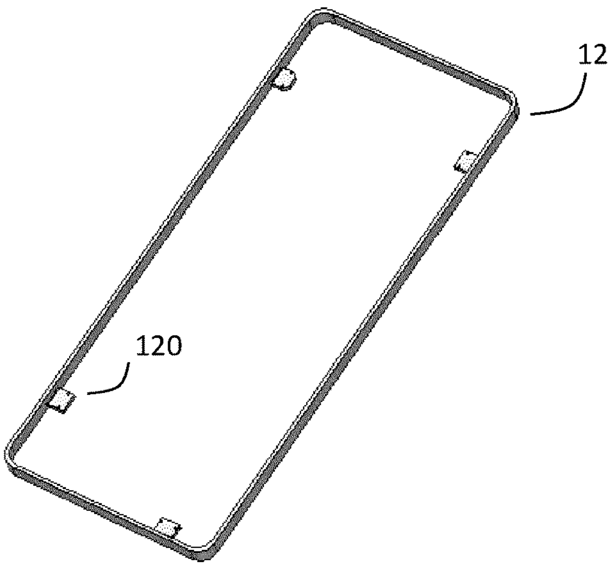
FIG. 9A schematically illustrates an embodiment of the antenna, in which various open cavity structures of each one antenna are integral with the metal frame.
Figure 9B:
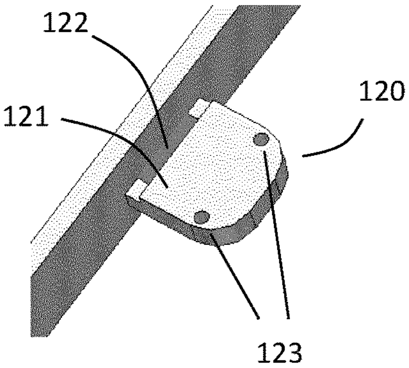
FIG. 9B schematically illustrates one open cavity structure integral with the metal frame, in a perspective view from a first side.
Figure 9C:
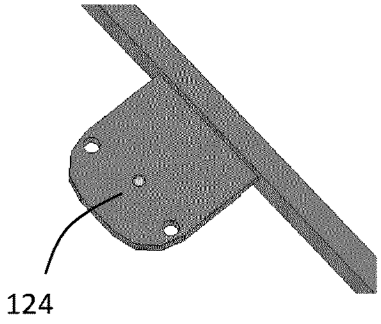
FIG. 9C schematically illustrates one open cavity structure integral with the metal frame, in a perspective view from a second side.

FIGS. 9A-9C schematically illustrate an alternative embodiment, in which the open cavity structure 120 is integral with the metal frame 12. FIG. 9A illustrates an arrangement with four open cavity structures, although fewer or more open cavity structures 120 may be comprised.

FIG. 9B illustrates how the open cavity structure 120 adapted for FR2 comprises a conductive member 121, integral with the metal frame 12 and configured to connect to a ground plane 11 of a substrate 110, as indicated in e.g. FIG. 2A but left out in this drawing. Moreover, the open cavity structure 120 comprises a dielectric member 121, attached to or inserted into the conductive member 121. In the shown embodiment, the dielectric member preferably extends out to the inner perimeter of the metal frame 12, and will thus be arranged in the gap 13 to the ground plane 11 when a substrate 110 comprising the ground plane 11 is connected to the metal frame 12, as illustrated in e.g. FIG. 2A. Attachment may be accomplished by means of soldering, gluing or e.g. by means of screws provided in orifices 123, such that a connection 124 is placed in contact with a feeding position of the open cavity structure 120.

Figure 10:
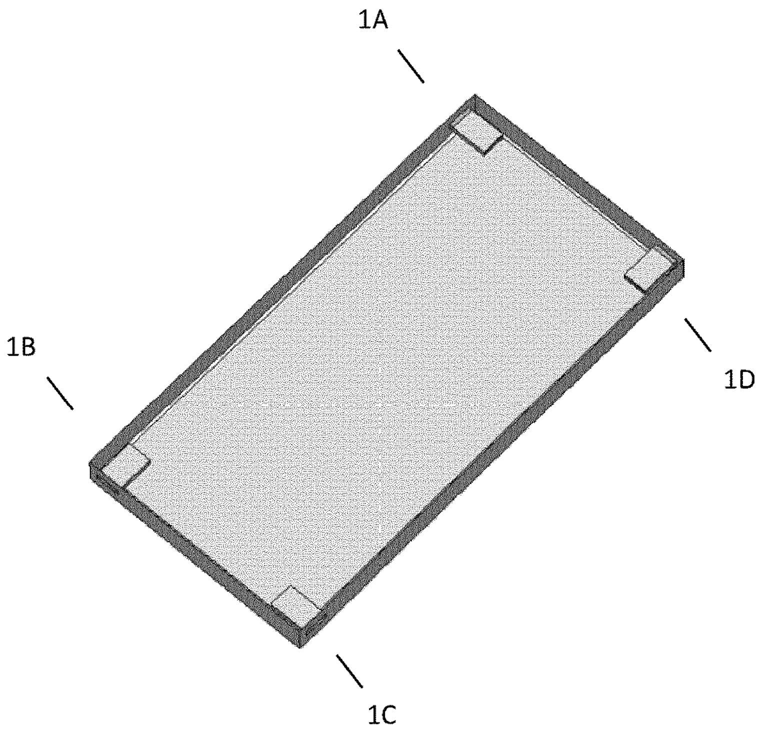
FIG. 10 schematically illustrates an antenna arrangement according to an embodiment, comprises four antennae arranged at different positions, which may be used in a beam switch antenna system for the second wavelength range.

FIG. 10 schematically illustrates an antenna arrangement 10 in which four antennae 1A-1D are arranged at different portions. This is similar to the embodiment of FIG. 9A, but here the open cavity structures 100, 120 of the respective antennae 1A-1D are positioned in different corners of the ground plane 11. Generally, multiple grounding connections are needed for cellular antennae 14 for FR1. Therefore, in some embodiments, plural grounding positions 15 are integrated with the proposed open cavity structure 100, 120, on multiple positions on the metal frame 12, to form the antennae 1A-1D for FR2.

Figure 11:
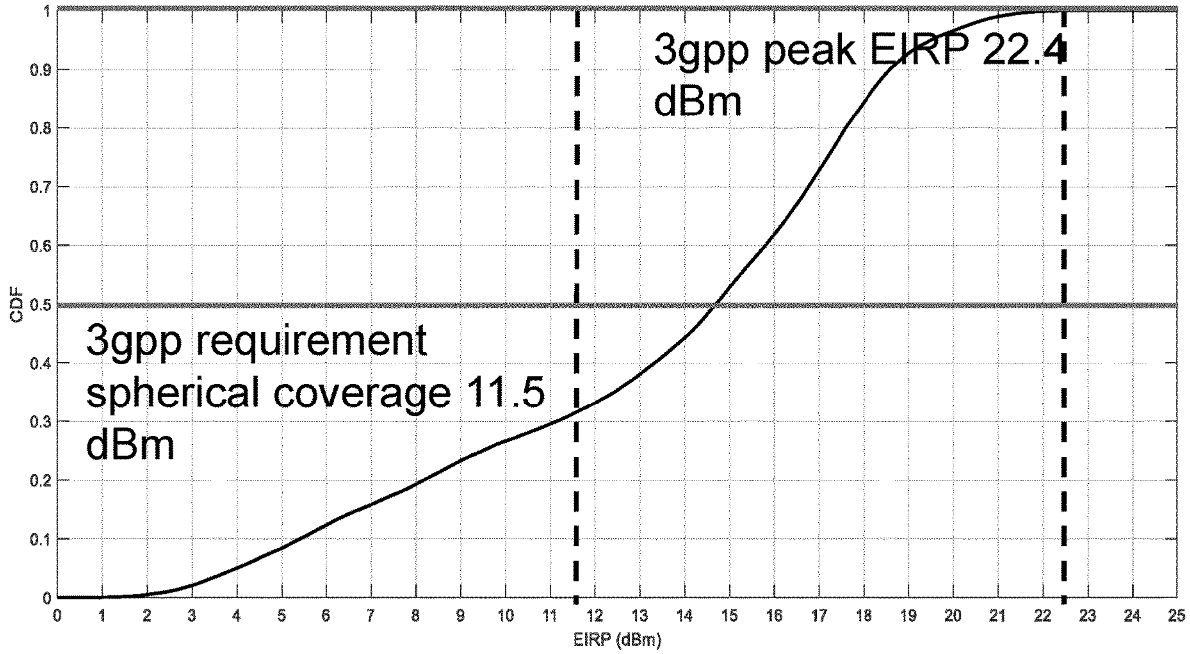
FIG. 11 schematically illustrates simulated power capability in a simulation of the antenna arrangement of FIG. 10.

In some embodiments, each antenna 1A-1D may be selectively used to realize a beam switch antenna system for FR2 in a wireless terminal incorporating the antenna arrangement 10. A benefit of such a beam switch antenna system is that it can achieve a large spherical coverage, a fundamental aspect for antenna systems in 3GPP requirements. FIG. 11 illustrates a graph representing simulated coverage of an antenna arrangement 10 as in FIG. 10, showing the cumulative distribution function (CDF) of the effective isotropic radiated power (EIRP). Tests show that the proposed beam switch array can meet 3GPP requirement with 12 dBm input power at antenna ports, where 12 dBm input power can be realized by any type of mainstream power amplifier type as the front end technology, such as CMOS, GaAs, GAN etc.

By means of various embodiments of the proposed antenna 1 employed in an antenna arrangement 10, the antenna 1 is configured to conveniently radiate or receive at the gap 13 arranged interior of the metal frame. This is beneficial in that it provides a convenient way of obtaining coverage even if a display module, or other conductive member, is placed over the ground plane 11.

Figure 12A:
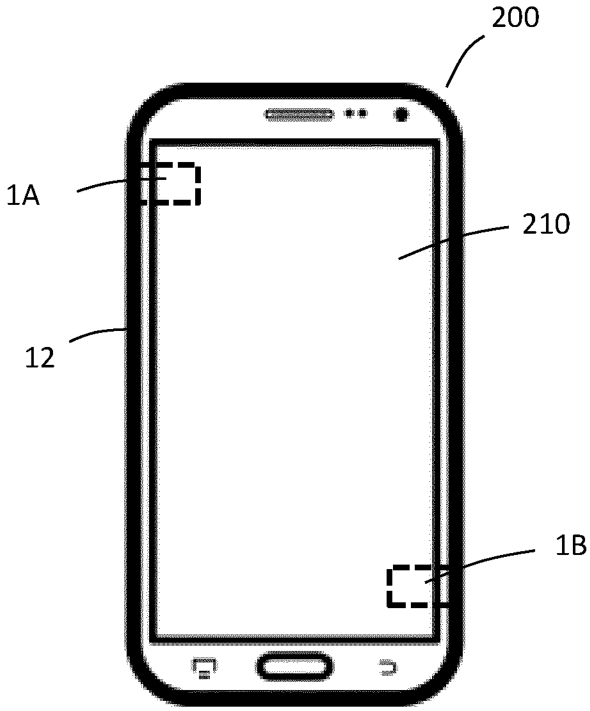
FIG. 12A schematically illustrates a wireless terminal according to various embodiments, including an antenna for use in the second wavelength range.

FIG. 12A schematically illustrates a wireless terminal 200, as seen towards a first surface representing a front face of the terminal. The metal frame 12 forms a perimeter of the terminal 200, and it also forms part of the antenna arrangement 10 in conjunction with one or more antennae 1A, 1B for FR2 operation, as described. Each of those antennae 1A, 1B include open cavity an open cavity structure 100A, 100B, also form grounding connections 15 for an antenna for FR1 operation. The front face of the terminal holds a display 210, which is disposed at least partly covering the ground plane 11 (not shown). The antennae 1A, 1B may be open-ended in the gap 13, outwardly of the display 210, thereby providing wireless coverage from the front face.

Figure 12B:
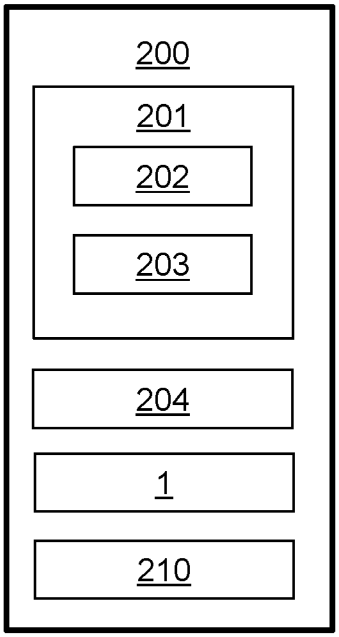
FIG. 12B schematically illustrates functional elements of a wireless terminal according to various embodiments, including an antenna for use in the second wavelength range.

FIG. 12B schematically illustrates the wireless terminal 200. The wireless terminal 200 may be configured for communication with an access network, and comprise a transceiver 204, such as a radio receiver and transmitter for communicating with the access network through at least an air interface. The terminal 1 further comprises logic 201. The logic 201 may comprise for example a controller or microprocessor 202. The logic may also comprise or be connected to a data storage device 203 configured to include a computer readable storage medium. The data storage device 203 may include a memory and may be, for example, one or more of a buffer, a flash memory, a hard drive, a removable media, a volatile memory, a non-volatile memory, a random access memory (RAM), or other suitable device. In a typical arrangement, the data storage device 203 includes a non-volatile memory for long term data storage and a volatile memory that functions as system memory for the controller 202. The data storage device 203 may exchange data with a processor 202 of the logic 201 over a data bus. The data storage device 203 is considered a non-transitory computer readable medium. One or more processors of the logic 201 may execute instructions stored in the data storage device or a separate memory in order to carry out operation of the wireless terminal 200, as outlined herein. The wireless terminal 200 further comprises at least one antenna 1 in accordance with the embodiments presented herein, configured for operation in FR1 and forming a grounding connector for FR1 operation, between a ground plane 11 and a metal frame 12 (not shown). The wireless terminal 200 may further comprise a display 210 as part of a user interface. It may be noted that the wireless terminal 200 clearly may include other features and functions than those identified, such as e.g. a power source, but these components are not shown in FIG. 12B for clarity reasons.

Figure 12C:
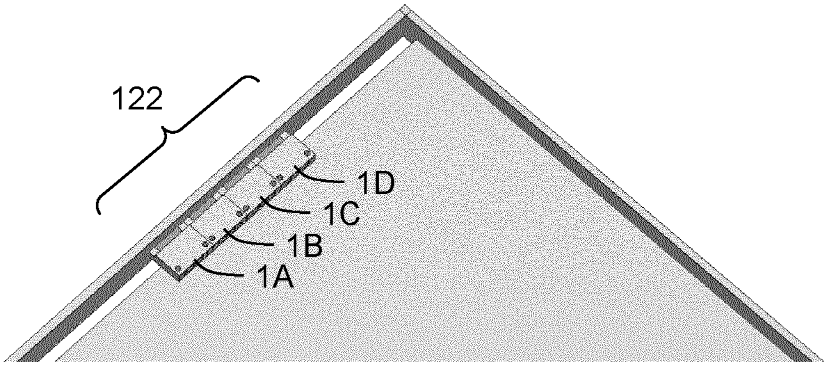
FIG. 12C schematically illustrates an antenna for a wireless terminal according to various embodiments, arranged as a phased array for use in the second wavelength range.

FIG. 12C schematically illustrates a portion of an embodiment, forming a variant of FIG. 12A, where a plurality of antennae 1A, 1B, 1C, 1D for FR2, configured in accordance with the solutions presented herein, are placed to form a phased array 122. The phased array antenna 122 may be operated through the transceiver 204 under control of the logic 201, to obtain spatially distinctive radio transmission and/or reception in the wireless terminal 200 in the FR2 frequency range.

Figure 13A:
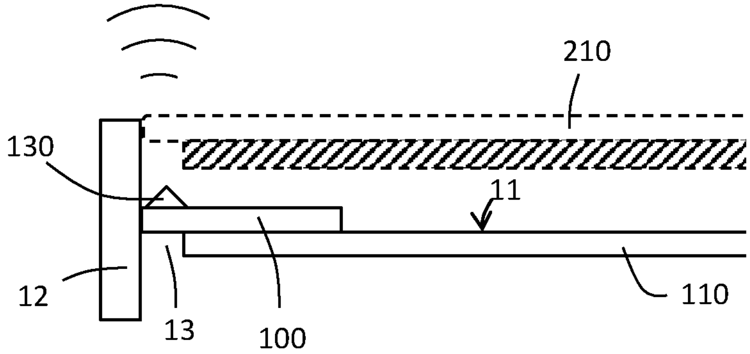
FIG. 13A schematically illustrates incorporation of a lens mounted at the open cavity structure, according to one embodiment.
Figure 13B:
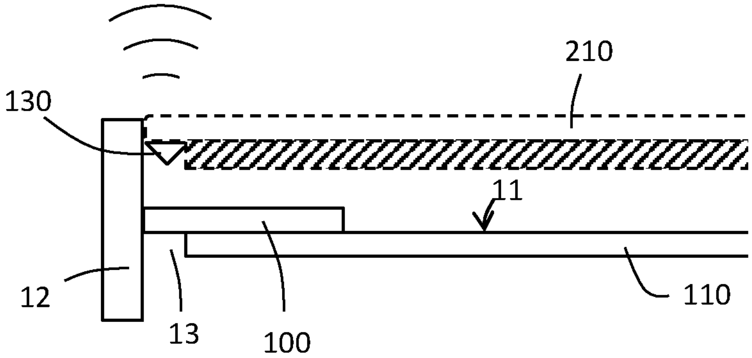
FIG. 13B schematically illustrates incorporation of a lens mounted at a display module over the open cavity structure, according to one embodiment.

FIGS. 13A and 13B schematically illustrate a cross-sectional view of an embodiment of a terminal of FIGS. 12A and 12B. In these drawings, the open cavity structure 100 is shown, provided at the gap 13 between the ground plane 11 and the metal frame 12. Moreover, the display 210 is provided over the ground plane 11. The display 210 is a module including at least one conductive layer, marked by the dashed pattern, which may act as a radiation shield, severely reducing wireless communication capability. However, by means of the application of the FR2 antenna 1 at the gap 13, where it forms a grounding connection for FR1 operation, a corresponding gap between the display 210 and the metal frame 12 is used to obtain communication capability to and from the front face of the terminal 200.

As indicated in FIGS. 13A and 13B, various embodiments may include a lens 130, provided to optimize a radiation pattern of the antenna 1 at the gap 13. The lens 130 is arranged over the antenna 1 and configured to focus or collimate radio waves of the second frequency range FR2. This arrangement may e.g. be employed to control or concentrate the radiation pattern in a direction substantially perpendicular to the ground plane 11 and display 130. The lens 130 may e.g. be attached by means of a glue which is transparent to the desired wavelength region of FR2.

In one embodiment, as indicated in FIG. 13A, such a lens may be provided on the open cavity structure 100, over the open surface portion 104.

In an alternative embodiment, as indicated in FIG. 13B, the lens may be provided on the display module 210, over the open surface portion 104.

The lens may take any suitable shape for the purpose of collimating the radiation to and from the antenna 1. This includes a wedge, trapezoid and convex shapes. The lens 130 may be manufactured in a material which is highly transmissive to the desired wavelength region of FR2 and having a suitable refractive index.

Figure 14:
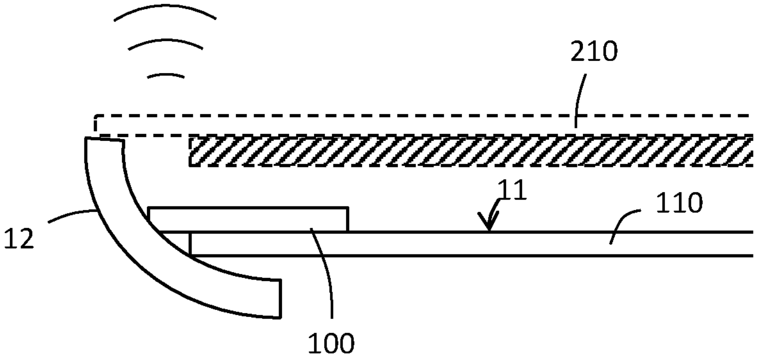
FIG. 14 schematically illustrates an antenna arrangement including a curved metal frame, assisting in beam-control for the open cavity structure according to an embodiment.

FIG. 14 schematically illustrates an antenna arrangement including a curved metal frame 12, assisting in beam-control for the open cavity structure according to an embodiment. With such a design, a sidelobe from the open cavity structure 100 may be reduced, while increasing a front-facing lobe, upwards in the drawing. In various embodiments, a lens 130 and a curved metal frame 12 may be combined to optimize the radiation pattern for the antenna 1.

The foregoing disclosure thus present various antenna designs realized by feeding energy from an open cavity waveguide-like structure 100 into a metal frame 12 for use in a wireless terminal. The large aperture on the metal frame helps to realize high gain at FR2, such as mm wave frequency bands, and also to shape the beam. For antenna systems, the larger aperture it has, the higher gain it can reach. The metal frame 12 behaves as a reflector, reflecting the energy toward certain desired direction. The proposed open cavity structure 100 further acts as grounding connection in FR1, which provides a convenient solution of integration of a multi band antenna system. Moreover, the open surface portion 104 on the open cavity structure 100 consumes very little space and is arranged in the small gap immediately interior of the metal frame 12. This way, the antenna of the proposed solution can be integrated on a full display wireless terminal.

The invention claimed is:

1. An antenna, for use in a wireless terminal, including a ground plane and a metal frame encompassing the ground plane with a gap between the metal frame and the ground plane;

wherein said antenna is configured to form a grounding connection between the ground plane and the metal frame for operation in a first frequency range; and wherein the antenna comprises an open cavity structure for a second frequency range, the open cavity structure includes a dielectric member and a conductive member configured to connect the ground plane with the metal frame and arranged to partially cover the dielectric member to present an open surface portion of the dielectric member at the gap.

2. The antenna of claim 1, wherein the open cavity structure is at least partially open-ended in said gap.

3. The antenna of claim 1, wherein open surface portion is configured at a first surface of the open cavity structure.

4. The antenna of claim 3, wherein said conductive member at least partially covers the dielectric member at a second surface, opposite said first surface, of the open cavity structure.

5. The antenna of claim 3, wherein said conductive member at least partially covers an edge surface of the open cavity structure, which edge surface connects to the first surface.

6. The antenna of claim 1, wherein said conductive member includes a surface coating on said dielectric member.

7. The antenna of claim 1, wherein said open cavity structure is a substrate integrated open cavity.

8. The antenna of claim 1, wherein said open cavity structure is integral with said metal frame.

9. The antenna of claim 1, wherein said open cavity structure is attached to, and protrudes sideways from, a substrate of the ground plane.

10. The antenna of claim 1, wherein said dielectric member is integral with a substrate of the ground plane.

11. The antenna of claim 10, wherein said dielectric member comprises a sideways protruding portion of the substrate of the ground plane.

12. The antenna of claim 1, wherein said grounding connection has a width, in a plane parallel with the ground plane, of half the wavelength of a central frequency of said second frequency range.

13. The antenna of claim 1, wherein the second frequency range is a mm wave range.

14. The antenna of claim 1, wherein the gap is at least 1.5 mm at said grounding connection.

15. The antenna of claim 1, comprising a lens configured to focus radio waves of the second frequency range, arranged over the antenna.

16. The antenna of claim 1, comprising a lens configured to focus radio waves of the second frequency range, arranged over the antenna, and wherein said lens is provided on said open-ended portion of the dielectric member.

17. An antenna arrangement comprising the antenna of claim 1;

said ground plane; and said metal frame encompassing the ground plane with a gap between the metal frame and the ground plane, wherein said antenna connects the ground plane to the metal frame at a grounding point.

18. A wireless terminal comprising an antenna arrangement according to claim 17.

19. The wireless terminal of claim 18, comprising a display module attached over the ground plane and a lens configured to focus radio waves of the second frequency range, arranged over the antenna, the lens is provided on said display module.

* * * * *